United States Patent
Catalano et al.

(10) Patent No.: US 12,346,276 B2
(45) Date of Patent: Jul. 1, 2025

(54) COMMAND TO AUTOMATICALLY SET PORT SPEED OF A DEVICE PORT

(71) Applicant: INTERNATIONAL BUSINESS MACHINES CORPORATION, Armonk, NY (US)

(72) Inventors: Pasquale A. Catalano, Wallkill, NY (US); Christopher J Colonna, Ossining, NY (US); Stephen Robert Guendert, Murfreesboro, TN (US); Michael James Becht, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 18/319,904

(22) Filed: May 18, 2023

(65) Prior Publication Data
US 2024/0385981 A1    Nov. 21, 2024

(51) Int. Cl.
G06F 13/36    (2006.01)

(52) U.S. Cl.
CPC ........ *G06F 13/36* (2013.01); *G06F 2213/40* (2013.01)

(58) Field of Classification Search
CPC ............................. G06F 13/16; G06F 2213/40
USPC .......................................................... 710/33
See application file for complete search history.

(56) References Cited

U.S. PATENT DOCUMENTS

| | | | |
|---|---|---|---|
| 5,479,652 A | 12/1995 | Dreyer et al. | |
| 7,882,354 B2 | 2/2011 | Greco | |
| 9,667,476 B2 | 5/2017 | Benner et al. | |
| 9,722,863 B2 | 8/2017 | Benner et al. | |
| 9,954,866 B2 | 4/2018 | Roth et al. | |
| 10,142,261 B2 | 11/2018 | Hathorn et al. | |
| 10,210,113 B2 | 2/2019 | Gowravaram et al. | |
| 10,460,124 B2 | 10/2019 | Wright | |
| 11,169,949 B2 | 11/2021 | Guendert et al. | |
| 11,212,001 B1 | 12/2021 | Catalano et al. | |
| 11,368,413 B2 | 6/2022 | Colonna et al. | |
| 11,520,678 B2 | 12/2022 | Guendert et al. | |
| 2015/0071287 A1 | 3/2015 | Berman | |
| 2015/0095476 A1* | 4/2015 | Kumbhari | G06F 9/4415 709/223 |
| 2015/0207694 A1* | 7/2015 | Inches | G06F 9/526 709/223 |

(Continued)

FOREIGN PATENT DOCUMENTS

WO    WO2014029818 A1    2/2014

OTHER PUBLICATIONS

Anonymous, "A Method to List Releasable SR-IOV Logical Ports for All Cases," IPCOM000230907D, Sep. 17, 2013, pp. 1-2 (+ cover).

(Continued)

*Primary Examiner* — Christopher B Shin
(74) *Attorney, Agent, or Firm* — Edward J. Wixted, III, Esq.; Blanche E. Schiller, Esq.; Heslin Rothenberg Farley & Mesiti P.C.

(57) ABSTRACT

A port speed of a port of a device is automatically set. A command is obtained at the device. The command provides an indication of a target port of the device and a selected port speed. Based on obtaining the command and using the device, a port speed of the target port is automatically set to the selected port speed.

20 Claims, 6 Drawing Sheets

(56) References Cited

U.S. PATENT DOCUMENTS

| | | | | |
|---|---|---|---|---|
| 2016/0204980 | A1* | 7/2016 | Benner | H04L 43/16 |
| | | | | 370/242 |
| 2020/0076585 | A1 | 3/2020 | Sheppard et al. | |
| 2021/0263877 | A1* | 8/2021 | Guendert | G06F 13/4068 |
| 2021/0374078 | A1* | 12/2021 | Martin | G06F 13/1668 |
| 2022/0052968 | A1 | 2/2022 | Catalano et al. | |
| 2023/0006912 | A1* | 1/2023 | Liu | G06N 3/042 |
| 2024/0095156 | A1* | 3/2024 | Sommers | G06F 11/261 |
| 2024/0385981 | A1* | 11/2024 | Catalano | G06F 13/36 |

OTHER PUBLICATIONS

Anonymous, "Automatically Correcting Event Flooding by Network Devices via a Network Management System," IP.com No. IPCOM000264650D, Jan. 18, 2021, pp. 1-9 (+ cover).
Anonymous, "High Efficiency Power Management With Dynamic Phase Control," IP.com No. IPCOM000181795D, Apr. 13, 2009, pp. 1-4 (+ cover).
Anonymous, "Method and Apparatus to Capture and Represent Power Consumption Data at the Application Level in a Computing Machine," IP.com No. IPCOM000191496D, Jan. 6, 2010, pp. 1-3 (+ cover).
Anonymous, "Method for Fastest-Path Discovery and Management in SAN Environment by Multipath-Driver," IP.com No. IPCOM000201810D, Nov. 23, 2010, pp. 1-3 (+ cover).
Anonymous, "Method for Targeted Configuration of SAN Devices," IP.com No. IPCOM000228595D, Jun. 20, 2013, pp. 1-4 (+ cover page).
Ansit, "Fibre Channel—Link Services—5 (FC-LS-5)—Rev 5.01," Jan. 12, 2021, pp. 1-236 (+ cover pages and index).
Brocade, "FICON Administrator's Guide," 53-1002473-02, Nov. 15, 2012, pp. 1-94.
Cisco, "Command Reference for Cisco NCS 1001," Published Jul. 14, 2017 (modified Feb. 22, 2023), pp. 1-48.
Driever, p. G., et al., "Securing the enterprise SAN with IBM Fibre Channel Endpoint Security," IBM J. Res & Dev., vol. 64, No. 5/6, Paper 4, Sep./Nov. 2020, pp. 4:1-4:8.
Fortinet, "Administration Guide—Standalone Mode—FortiSwitchOS 7.2.3," Apr. 10, 2023, pp. 1-418.
Guendert, Steve, "To CUP, or Not to CUP? That is the (FICON) Question!," BROCADE, Computer Measurement Group International Conference, Dec. 2007, pp. 1-36.
Keysight Technologies, "N7744A 4-Channel Optical Multiport Power Meter, N7745A 8-Channel Optical Multiport Power Meter Data Sheet," Dec. 2, 2017, pp. 1-7.
Micron, "The SMART Command Feature Set for the P200e SSD Firmware 0142," TN-FD-10: P400e SS SMART Implementation for FW0142 Introduction, Dec. 2012, pp. 1-41.
Network Technolgies Incorporated, "Secure Remote Power Control Unit with Environmental Monitoring," 2021 (no further date information available), 3 pages.
Ogu, Emmanuel C. et al., "Temperature Control System," Apr. 2011, 94 pages.
Anonymous, "Monitoring, Diagnostic, and Alternate-Route Detection Tool for SAN," IP.com No. IPCOM000143262D, Nov. 17, 2006, pp. 1-2 (+ cover).
Anonymous, "PCIe Throttling Based on Network Congestion," IP.com No. IPCOM000263344D, Aug. 20, 2020, pp. 1-5 (+ cover).
Anonymous, "Using Data Recognition for Storage Optimization," IP.com No. IPCOM000266245D, Jun. 28, 2021, pp. 1-6 (+ cover).
White Paper, "Brocade CUP Diagnostics and the IBM Health Checker for z/OS," 2021 (no further date information available), pp. 1-16.
Fortinet, "Administration Guide—Standalone Mode FortiSwitchOS 7.2.2," Feb. 28, 2023, 412 pages.
Cisco, "Configure Port Settings on Optimize Traffic Flow on a Switch," 2021 (no further date information available), pp. 1-7.

\* cited by examiner

| 502 | 504 | 506 | 508 | 510 | 512 | 514 |
|---|---|---|---|---|---|---|
| CODE | COMMAND | DESCRIPTION | TKI | IDENTIFY | ACCEPTED WITH HCP | COUNT |
| X 'xx' | COMMAND NAME | COMMAND DESCRIPTION | Y/N | Y/N | Y/N | X |

| 522 | 524 | 526 | 528 | 530 | 532 | 534 |
|---|---|---|---|---|---|---|
| CODE | COMMAND | DESCRIPTION | TKI | IDENTIFY | ACCEPTED WITH HCP | COUNT |
| CODE | CONTROL UNIT PORT | TRANSFERS PORT SPEED MASK | Y | Y | Y | 1024 |

| WORD | BYTE 0 | | BYTE 1 | BYTE 2 | BYTE 3 |
|---|---|---|---|---|---|
| 0 | DIRECTOR TYPE | C | SOURCE PORT ADDRESS IDENTIFIER—558 | | |
| 1 | DIRECTOR DOMAIN ID | | DESTINATION PORT ADDRESS IDENTIFIER—562 | | |
| 2 | PORT SPEED MASK—560 | | | AN | F | RESERVED |
| 3-15 | RESERVED —564 | | | | |

COMMAND TO AUTOMATICALLY SET PORT SPEED OF A DEVICE PORT

BACKGROUND

One or more aspects relate, in general, to facilitating processing within a computing environment, and in particular, to facilitating communication within the computing environment.

Certain computing environments use storage area networks to provide access between devices. For example, a storage area network provides data paths between one or more host devices and one or more storage devices. The data paths may include network devices, such as switches, and communication links. The links may be fiber optic or other types of cables or even wireless.

A device, such as a network device, has ports, which receive and/or transmit information. Each port has an address or other identifier to uniquely identify the port of the storage area network. Further, each port has a port speed associated therewith.

The port speed is manually set, and in some cases, is to be fixed or pinned to a specific speed.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes obtaining, at a device, a command that provides an indication of a target port of the device and a selected port speed. Using the device and based on obtaining the command, a port speed of the target port is automatically set to the selected port speed.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects of the present invention, a capability is provided to facilitate processing within a computing environment. In one aspect, the capability includes facilitating communication within the computing environment by automatically setting a port speed of a target port of a device, such as a network device. The port speed refers to, e.g., a maximum amount of data that can be transmitted through the port at a given time, e.g., per second. As examples, port speed is measured in kilobits per second, gigabits per second or terabits per second. In one example, the port speed is set based on receipt of a command, such as a control unit port command, that indicates the target port and a selected port speed for the target port.

The automatically setting the port speed of the target port is performed by, e.g., the device based on receiving the command from another device, e.g., a host device coupled to the device. This replaces a manual setting of the port speed on the device. In one example, the device is a network device that is part of a storage area network. Further, the other device may be part of the storage area network, or separate therefrom and coupled to one or more devices of the storage area network.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., automatically sets port speeds and/or performs one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as port speed setting code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

Figure 1:
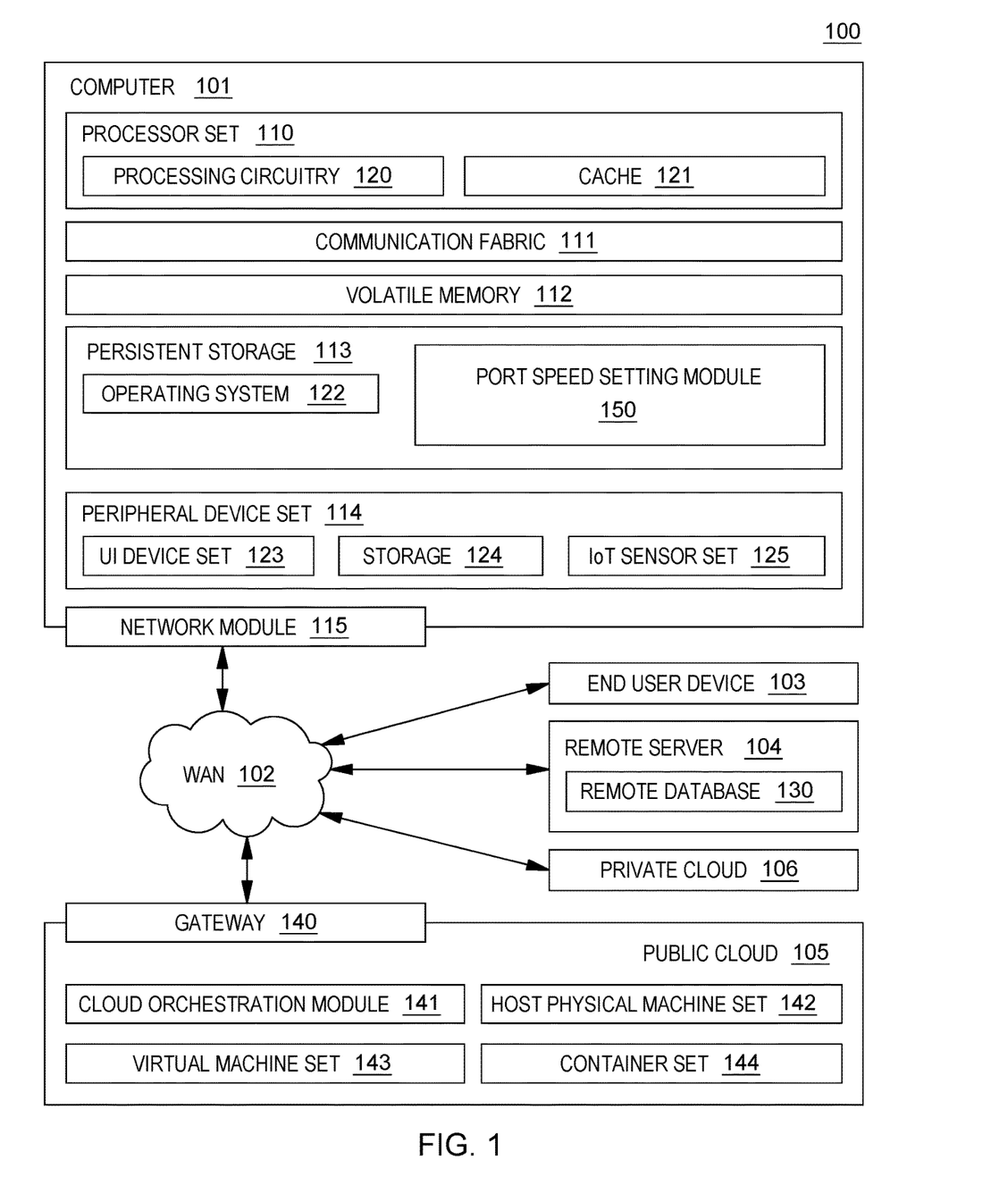
FIG. 1 depicts one example of a computing environment to incorporate, perform and/or use one or more aspects of the present invention.

Further details relating to one or more components/modules of FIG. 1 used in accordance with one or more aspects of the present invention are described herein. For example, storage 124 is provided, in one example, by a storage network, such as a storage area network (SAN). In one example, a storage area network includes a plurality of devices coupled to one another via a plurality of connections. As examples, the plurality of devices includes endpoint devices (e.g., servers, such as computer 101; one or more processors and/or nodes of processor set 110; remote servers, such as remote server 104; and/or end user devices 103; etc.), network devices (e.g., switches, directors, appliances, etc.) and/or other devices; and the connections include, for instance, links and/or other connections. Many examples are possible.

One example of a storage area network is described with reference to FIG. 2. In one example, a storage area network 200 includes one or more network devices 210, such as one or more switches, directors, appliances, etc. As examples, one or more of network devices 210 support the Fibre Channel and/or Fibre Channel over Ethernet protocols. Although the Fibre Channel and/or Fibre Channel over Ethernet protocols are specified herein, one or more of the network devices may support other protocols. Fibre Channel and/or Fibre Channel over Ethernet protocols are just examples. Further, in one or more examples, storage area network 200 may include a network fabric, such as a switched fabric, which includes, for instance, a plurality of network devices (e.g., directors or switches based on fibre technology, other directors or switches and/or other network devices) coupled to one another via one or more connections (e.g., inter-switch links, other links and/or other connections). Various examples are possible.

Each network device 210 includes, for instance, one or more ports 212 that connect a network device to one or more other devices, including one or more other network devices and/or one or more other devices (referred to herein as non-network devices) via one or more links.

In one example, one or more of network devices 210 is coupled to a device 220 via one or more links 230. As examples, the device may be a computer, such as computer 101 or other computer; a processor or node, such as a processor or node of processor set 110 or other processor or node; a remote server, such as remote server 104 or other remote server; an end user device, such as end user device 103 or other end user device; or other non-network device of a computing environment, such as computing environment 100. The device also includes, in one example, one or more ports 222 that connect the device to one or more network devices 210 and/or to other non-network devices. In one example, ports 222 of device 220 and/or other non-network devices (such as other endpoint devices, etc.) are referred to, in one example, as channel ports, while ports 212 of network device 210 are referred to, for instance, as switch ports. Other examples are possible.

In one example, device 220 is separate but coupled to the storage area network. In another example, it is part of the storage area network. In one example, device 220 includes an operating system 224 or another control program that sends commands from the device to, e.g., a network device. In one example, the device (e.g., device 220) is a host device. Other examples and/or variations are possible.

Figure 2:
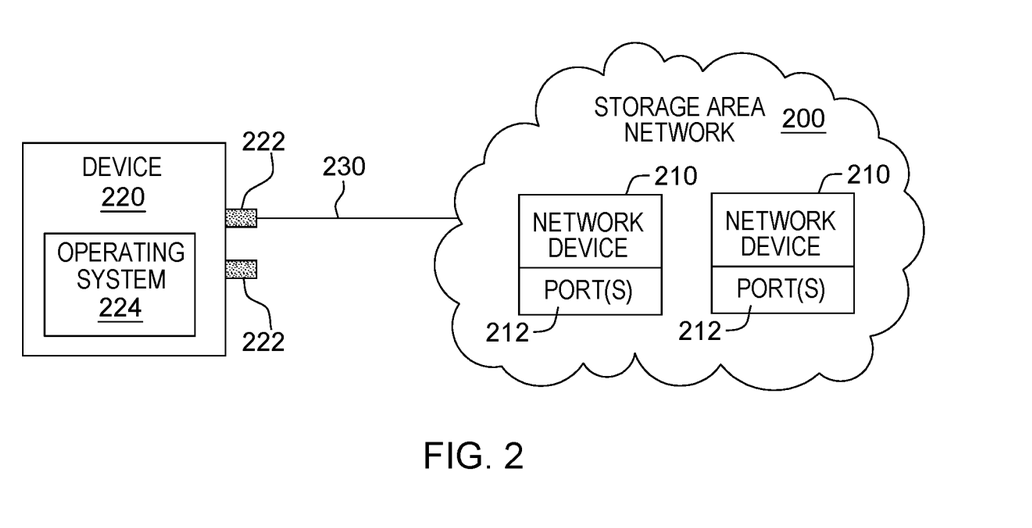
FIG. 2 depicts one example of aspects of a storage area network to incorporate, perform and/or use one or more aspects of the present invention.

The storage area network of FIG. 2 is only one example. Storage area networks may include additional, fewer and/or other devices (network and/or non-network devices), ports and/or connections. Many examples and variations are possible. For instance, the number, type and interconnections of the devices and connections in each storage area network may be different. Further, storage area networks may support other transmission protocols. Again, many variations are possible.

In one or more aspects, the speed of a port, such as a port of a network device, may be set automatically based on, for instance, a command indicating a selected port speed. Further details relating to setting port speeds are described with reference to FIGS. 3A-3C. For example, FIGS. 3A-3C depict further details of a port speed setting module (e.g., port speed setting module 150 of FIG. 1) that includes code or instructions used to set port speeds, in accordance with one or more aspects of the present invention.

Figure 3A:
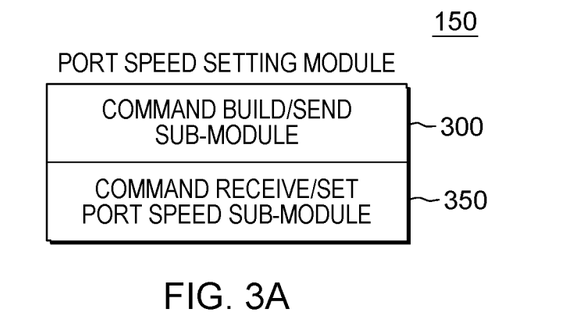
FIG. 3A depicts one example of sub-modules of a port speed setting module of FIG. 1, in accordance with one or more aspects of the present invention.
Figure 3B:
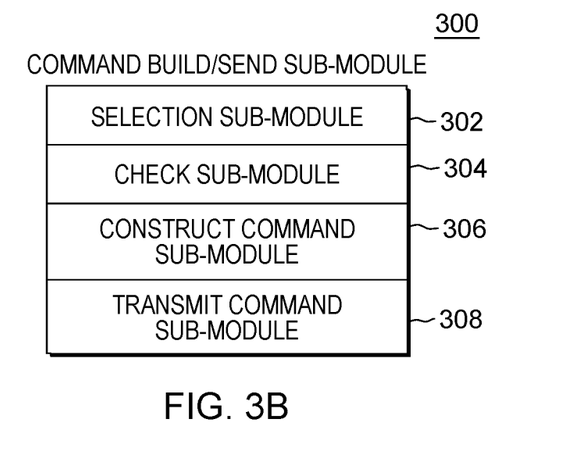
FIG. 3B depicts one example of sub-modules of a command build/send sub-module of the port speed setting module of FIG. 3A, in accordance with one or more aspects of the present invention.
Figure 3C:
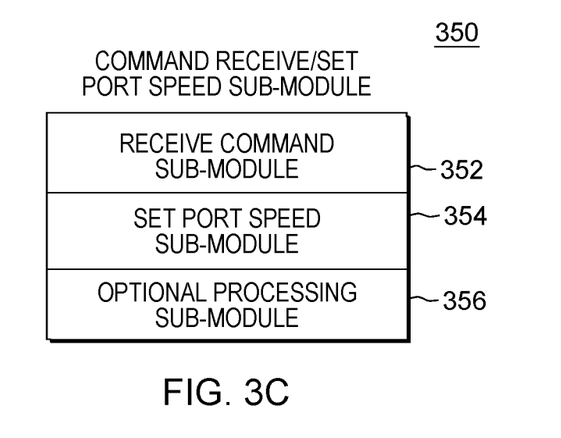
FIG. 3C depicts one example of sub-modules of a command receive/set port speed sub-module of the port speed setting module of FIG. 3A, in accordance with one or more aspects of the present invention.

In one or more aspects, referring to FIG. 3A, a port speed setting module (e.g., port speed setting module 150) includes, in one example, various sub-modules to be used to set port speeds and/or to perform tasks relating thereto. The sub-modules are, e.g., computer readable program code (e.g., instructions) in computer readable media, e.g., storage (persistent storage 113, cache 121, storage 124, other storage, as examples). Although, as an example, port speed setting module 150 is depicted in FIG. 1 in persistent storage 113, one or more sub-modules may be in other storage, such as storage 124, etc. Many variations are possible.

The computer readable media may be part of one or more computer program products and the computer readable program code may be executed by and/or using one or more devices (e.g., one or more computers, such as computer(s) 101; one or more servers, such as remote server(s) 104; one or more processors or nodes, such as processor(s) or node(s) of processor set 110; processing circuitry, such as processing circuitry 120 of processor set 110; one or more network devices (e.g., networks devices 210 (FIG. 2)) and/or other devices, etc.). Additional and/or other computers, servers, processors, nodes, processing circuitry, network devices and/or other devices may be used to execute one or more of the sub-modules and/or portions thereof. Many examples are possible.

Example sub-modules of port speed setting module 150 include, for instance, a command build/send sub-module 300 to build a control unit port command to be used to set a port speed and to send the command to a target device (e.g., a target network device); and a command receive/set port speed sub-module 350 to receive the command and set the port speed. Additional, fewer and/or other sub-modules may be used to implement the port speed setting processing. Other variations are possible. Although various sub-modules are described, a port speed setting module, such as port speed setting module 150, may include additional, fewer and/or different sub-modules. A particular sub-module may include additional code, including code of other sub-modules, less code, and/or different code. Further, additional and/or other modules may be used to set port speeds and/or perform related tasks. Many variations are possible.

Further details relating to command build/send sub-module 300 are described with reference to FIG. 3B and further details relating to command receive/set port speed sub-module 350 are described with reference to FIG. 3C. In one example, command build/send sub-module 300 is executed on a non-network device, such as device 220, and command receive/set port speed sub-module 350 is executed on a network device, such as network device 210. Other examples/variations are possible.

Referring to FIG. 3B, in one example, command build/send sub-module 300 includes a selection sub-module 302 to be used to select a port for which the port speed is to be set and to select one or more port speeds; a check sub-module 304 to be used to perform one or more verifications; a construct command sub-module 306 to be used to build a command, such as a control unit port command; and a transmit command sub-module 308 to be used to send the built command (e.g., control unit port command) to the target device (e.g., network device 210). Additional, fewer and/or other sub-modules may be used to implement the port speed setting processing. Other variations are possible.

Referring to FIG. 3C, in one example, command receive/set port speed sub-module 350 includes a receive command sub-module 352 to be used to receive the built command (e.g., control unit port command) at the target device (e.g., network device 210); set port speed sub-module 354 to be used to set the port speed at the selected port at the target device; and optional processing sub-module 356 to be used to perform optional processing associated with setting the port speed. Additional, fewer and/or other sub-modules may be used to implement the port speed setting processing. Other variations are possible.

One or more of the sub-modules are used, in accordance with one or more aspects of the present invention, to build a command and to transmit the command to set a port speed and/or perform other tasks related thereto, as further described with reference to FIG. 4. In one example, a command build/send process (e.g., a command build/send process 400) is implemented using one or more of the sub-modules (e.g., one or more of sub-modules 300-308) and is executed by a device, such as device 220. In one example, device 220 is a computing device (e.g., computer (e.g., computer 101, other computer, etc.), a server (e.g., server 104, other server, etc.), a processor, node and/or processing circuitry, etc. (e.g., of processor set 110 or other processor sets), and/or one or more other computing devices, etc.). Although example devices, computers, servers, processors, nodes, processing circuitry and/or computing devices are provided, additional, fewer and/or other computers, servers, processors, nodes, processing circuitry and/or computing devices may be used for the build/send command process and/or other processing. Various options are possible.

Figure 4:
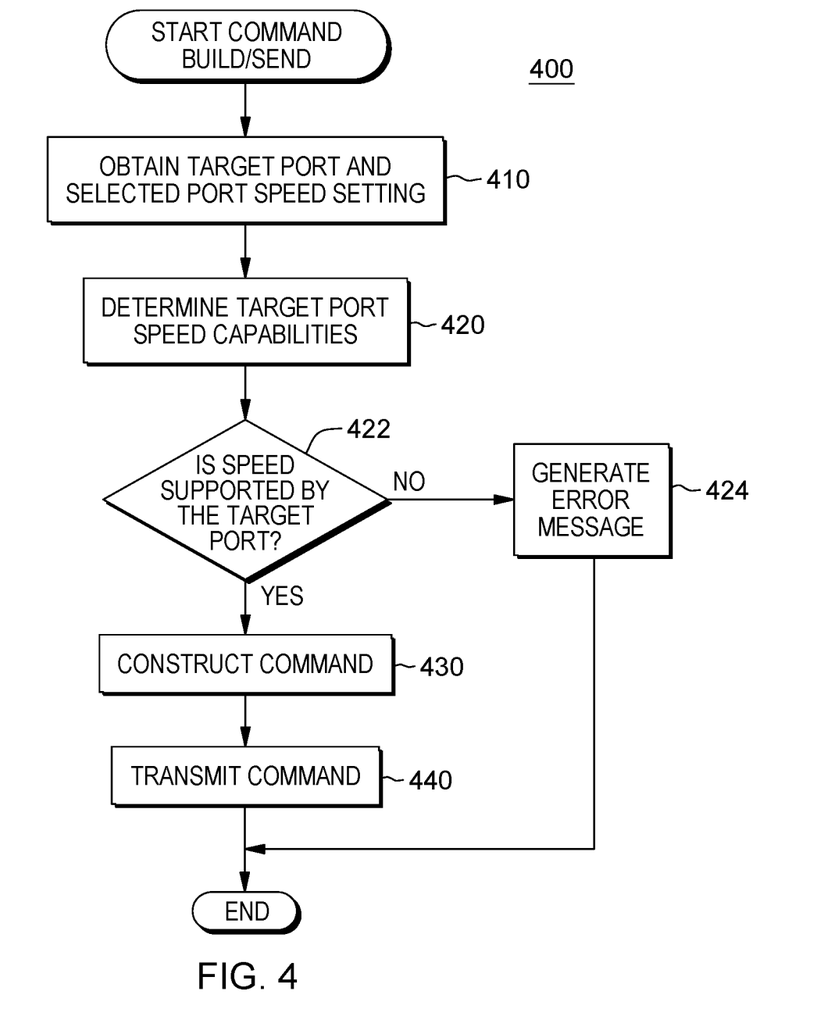
FIG. 4 depicts one example of a command build/send process, in accordance with one or more aspects of the present invention.

In one example, referring to FIG. 4, process 400 obtains 410 a target port and a selected port speed setting. For example, a target port and desired port speed are selected and provided to process 400. The selections may be performed by, for instance, a user at a device, such as device 220, via, e.g., an operating system (e.g., operating system 224) or the selections may be determined by the host (e.g., operating system) or other application, control, etc. Other examples are possible.

Process 400 determines 420 the capabilities of the selected target port. As an example, the speed capabilities of the port are determined using, for instance, a command or service to obtain information relating to the port. As an example, a Read Diagnostic Parameters Extended Link Service request (e.g., which is part of, e.g., the Fibre Channel Link Services) may be used to obtain one or more port speed capabilities of the target port. For instance, the Read Diagnostic Parameters Extended Link Service requests the target port to return information associated with the port. This information includes, for instance, port speed capabilities indicating supported port speeds of the port. As an example, based on the Read Diagnostics Parameters Extended Link Service request, a port descriptor is returned to the requestor (e.g., operating system) that includes, e.g., a port speed mask indicating the supported port speeds of the target port. Other services and/or commands may also be used to request the supported port speeds.

Process 400 determines 422 whether the selected port speed is supported by the target port. For instance, the obtained port speed capability data is checked for the selected port speed. If the selected port speed is not a capability of the target port, then, in one example, process 400 generates 424 an error message, which may be provided to the user, host and/or host device (e.g., computing device executing the operating system), as examples. The message indicates, for instance, that the selected speed cannot be set for the target port; the selected speed is, for instance, not supported by the target port, etc. The command build/send processing is complete.

Returning to inquiry 422, if, however, the selected port speed is a capability of the target port, then, in one example, process 400 constructs 430 a command, such as a control unit port command, to set the port speed of the target port to the selected port speed. For instance, the process (e.g., using the operating system) constructs the control unit port command using the target port information and the selected port speed setting.

Process 400 transmits 440 the command to the target device. For instance, process 400 transmits the command from, e.g., the operating system (e.g., operating system 224) to the target device (e.g., network device 210) using, e.g., the input/output subsystem.

Figure 5A:
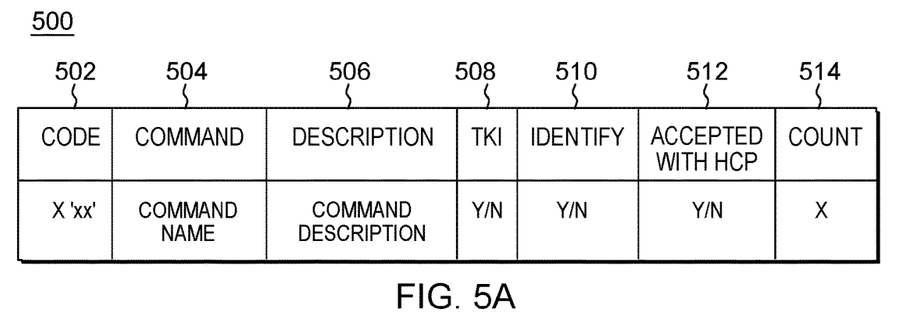
FIG. 5A depicts one example of a format of a command, in accordance with one or more aspects of the present invention.

One example format of a command to be constructed and transmitted is depicted in FIG. 5A. As shown, in one example, a command format includes a code field 502, which includes a unique code identifying the command; a command field 504, which indicates the command; a description field 506, which provides a description of the command; a test key and increment (TKI) field 508, which indicates whether a test key and increment command with an equal test comparison is to be included in the same channel command word chain prior to the command; an identify field 510, which indicates whether an identify command is to be included in the same channel command word chain prior to the command; an accepted with host control prohibited (HCP) field 512, which indicates whether the command will be accepted or not when host control is prohibited; and a count field 514, which indicates an amount of data to be transferred.

Figure 5B:
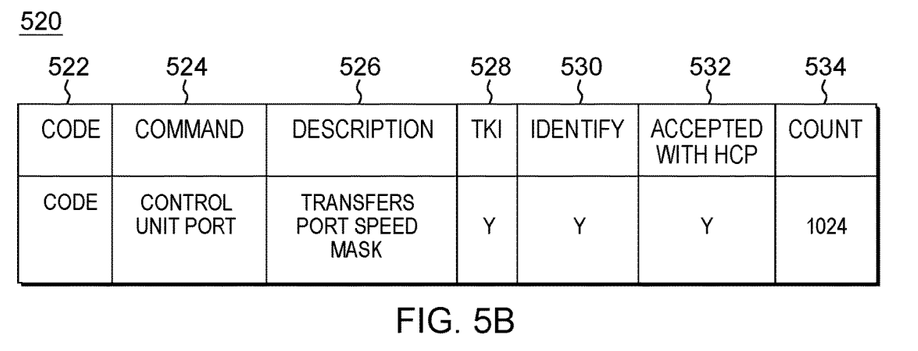
FIG. 5B depicts one example of a control unit port command to set a port speed of a target port, in accordance with one or more aspects of the present invention.

This format is used, for instance, for the command, e.g., the control unit port command, being constructed. For example, as depicted in FIG. 5B, a control unit port command 520 includes the same format as described with reference to FIG. 5A. In one example, for control unit port command 520, a code field 522 includes a unique code for the control unit port command; a command field 524 indicates the control unit port command; a description field 526 indicates that, at least, a port speed mask is being transferred; TKI field 528, Identify field 530 and Accepted with HCP field 532 are set to Yes; and Count field 534 is set to 1024, as examples. The command may include additional, less and/or other information.

Figure 5C:
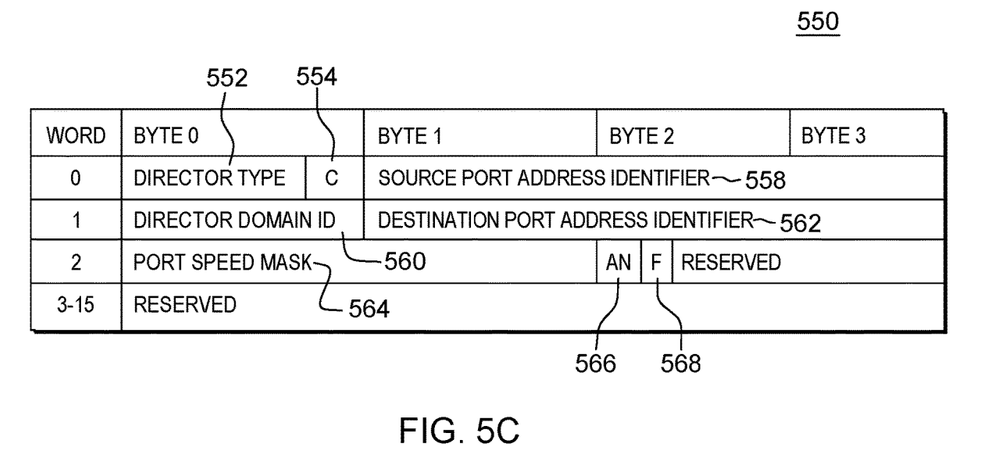
FIG. 5C depicts one example of information, including a port speed mask, transmitted using the control unit port command of FIG. 5B, in accordance with one or more aspects of the present invention.

One example of the information transferred using the control unit port command is described with reference to FIG. 5C. In one example, information 550 includes:

Director type 552 (e.g., bits 0-3 of word 0): This field identifies the type of director (e.g., switch), in which, in one example: Code 1 is a source only director—the associated director contains the source port address identifier specified in another command, such as a Set Diagnostics Parameter command; Code 2 is an intermediate director—the associated director is located between the source director and destination director and does not contain either the source or destination port address identifier specified in another command, such as the Set Diagnostics Parameter command; and Code 3 is a destination director—the associated director contains the destination port address identifier specified in another command, such as the Set Diagnostics Parameter command and is not the only director in the path between the source and destination port address identifiers.

In one example, the Set Diagnostics Parameter Command has the format depicted in FIG. 5A (e.g., with TKI set to No; Identify set to No; Accepted with HCP set to Yes; and Count set to 64) and is used to transfer a diagnostic parameter record (e.g., 64 bytes) from the host (e.g., device 220) to, e.g., a network device (e.g., network device 210, such as the director) that specifies diagnostic parameters to be used to obtain diagnostic information. In one example, the host issues another command, such as a Read Diagnostic Information command, that transfers from the network device to the host diagnostic information obtained based on the diagnostic parameter record transferred via the set command. In one example, the Read Diagnostic Information has the format depicted in FIG. 5A (e.g., with TKI set to No; Identify set to No; Accepted with HCP set to Yes; and Count set to N for N bytes).

C 554 (e.g., bit 4 of word 0): This field when set to a defined value, such as 0, indicates the link reset threshold used is the transmit frame pacing time; and when set to another defined value, such as 1, indicates the link reset threshold used is the receive transmit frame pacing time.

Source port address identifier 558 (e.g., bytes 1-3 of word 0): This field contains, for instance, a 24-bit fibre channel source port address identifier specified in a preceding command, such as the Set Diagnostic Parameters command.

Director domain id 560 (e.g., byte 0 of word 1): This field contains, for instance, an 8-bit unsigned binary integer equal to the domain id of the director being described.

Destination port address identifier 562 (e.g., bytes 1-3 of word 1): This field contains, for instance, a 24-bit fibre channel destination port address identifier specified in a preceding command, such as the Set Diagnostic Parameters command.

Port speed mask 564 (e.g., bytes 0-1 of word 2): This field includes a port speed mask that is used to indicate the selected port speed of the target port (e.g., identified by the destination port address identifier). Example bits of the word and corresponding speeds include:

Bit 0—1 Gb (gigabit)
Bit 1—2 Gb
Bit 2—4 Gb
Bit 3—10 Gb
Bit 4—8 Gb
Bit 5—16 Gb
Bit 6—32 Gb
Bit 7—64 Gb
Bits 8:15—Reserved for future/other speeds In one example, if a bit is set to a defined value (e.g., 1), then the corresponding port speed is the selected port speed for the target port. In other examples, one or more port speeds may be selected, and the target device, as an example, chooses the port speed to be used from the one or more selected port speeds. Other variations are possible.

Auto-Negotiate (AN) 566 (e.g., bit 0 of byte 2): When set to a defined value, the port speed mask is ignored and the port is reset to an auto-negotiated speed.

Forward error correction (F) 568 (e.g., bit 1 of byte 2): This field is valid, in one example, when 16 Gb is indicated in the port speed mask, otherwise, it is ignored. If set to a defined value, e.g., 0, then forward error correction for 16 Gb link speeds is unenabled. If set to another defined value, e.g., 1, then the forward error correction mode for 16 Gb link speeds is set.

Although in the example information described herein, specific words/bytes/bits are indicated for the fields, other words/bytes/bits may be used for the specific fields. Further, although the words/bytes/bits are set to specific values for one purpose or another, the words/bytes/bits may be set to the opposite values and/or different values. The particular words/bytes/bits and/or values described herein are just examples. Moreover, other example information may include more, fewer, and/or other fields.

In one example, the constructed command is received at a target device (e.g., device 210) for which the port speed is to be automatically set based on the command. In one example, one or more of the sub-modules are used, in accordance with one or more aspects of the present invention, to receive the command, set the port speed and/or perform other tasks related thereto, as described with reference to FIG. 6. In one example, a command receive/set port speed process (e.g., a command receive/set port speed process 600) is implemented using one or more of the sub-modules (e.g., one or more of sub-modules 350-356) and is executed by a device, such as network device 210. In one example, network device 210 includes a switch, a director, an appliance and/or other network device. A network device may have processing circuitry. In other examples, other devices that have ports, other than network devices, may also receive a port speed setting command and set a port speed based thereon. Various options are possible.

Figure 6:
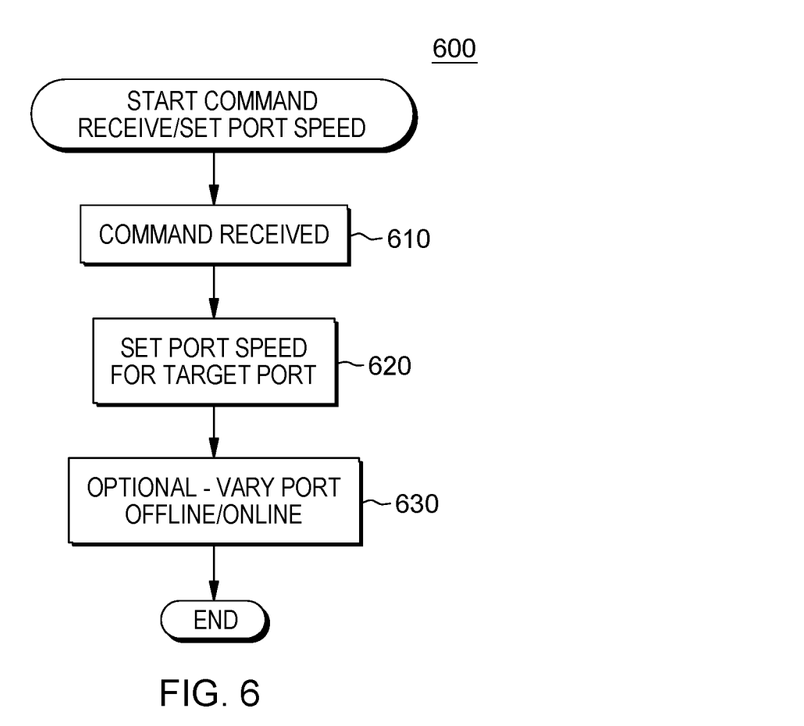
FIG. 6 depicts one example of a command receive/set port speed process, in accordance with one or more aspects of the present invention.

In one example, process 600 executing on a device (e.g., network device 210) receives 610 the command and sets 620 the port speed of the target port of the device based on, e.g., the destination port address identifier and the port speed mask provided in the command.

Optionally, in one example, process 600 varies 630 the port offline/online to enable the new speed to take effect. In other examples, the varying offline/online is not performed.

In one or more aspects, a capability is provided to send a command, such as a control unit port command, to a storage area network device (or other device) to automatically set a port speed on a port in the fabric. This avoids having to manually set the port speed, improving communications and processing within a computing environment.

In one or more aspects, a host, as an example, may use an architected control unit port command to target a specific port of the storage area network environment. The host can determine a valid speed for the port by reviewing information obtained using, for example, a command or service, such as a Read Diagnostics Parameters Extended Link Service request (or other types of requests, commands and/or services). The host constructs the control unit port command, based on, e.g., the retrieved information, indicating the speed at which the target port is to be set. The constructed control unit port command is sent with an identified target port and the desired speed to the target device. The target device receives the command and sets the port speed, as indicated in the command.

One or more aspects of the present invention are tied to computer technology and facilitate processing within a computer, improving performance thereof. For instance, communication within a computing environment is improved by providing a capability to automatically set a port speed. A capability is provided for the attached host device to inform one or more storage area network devices the speed(s) at which to set the port(s). Processing within a processor, computer system and/or computing environment is improved.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other techniques to indicate the available port speeds may be used. Further, other services and/or commands may be used to obtain port information. Moreover, additional, less and/or other information may be transmitted using the control unit port command or other command used to set the port speed. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment and replacing manual settings of port speeds, the computer program product comprising:

one or more computer readable storage media and program instructions collectively stored on the one or more computer readable storage media for causing at least one device to perform computer operations comprising:

obtaining, at a device of the at least one device, a command constructed by a bost device of the computing environment, the host device being coupled to the device, the command constructed based on receiving supported port speeds of a network device of a network of the computing environment and determining that a selected por edis ported by t port of the network device, the command transmitted to the device and including providing an indication of a-the target port of the network device and the selected port speed for the target port; and automatically setting, by the device and based on obtaining the command constructed and transmitted to the device, a port speed of the target port to the selected port speed, the automatically setting the port speed replacing the manual setting of the port speed.

2. The computer program product of claim 1, wherein the selected port speed is included in a mask of port speeds included in information transmitted with the command.

3. The computer program product of claim 1, wherein the mask of port speeds provides an indication of one or more supported port speeds for the target port, and the selected port speed is indicated by setting an indicator corresponding to the selected port speed of the one or more supported port speeds.

4. The computer program product of claim 2, wherein the method further comprises:
checking a field of the command to determine that the mask of port speeds is to be used; and
performing the automatically setting using the mask of port speeds, based on the field indicating that the mask of port speeds is to be used.

5. The computer program product of claim 1, wherein the command is constructed based on a selection of the target port and the selected port speed.

6. The computer program product of claim 5, wherein the command is constructed based on confirming that the selected port speed is supported by the target port.

7. The computer program product of claim 1, wherein the computer operations further comprise:
determining that reactivation of the target port is to be performed to change the port speed of the target port to the selected port speed;
deactivating the target port, based on determining that reactivation of the target port is to be performed; and
bringing the target port online to reactivate the target port with the selected port speed.

8. The computer program product of claim 1, wherein the command is a control unit port command constructed based on a defined format, the defined format including a command code, a command name, a description and other information relating to the command.

9. The computer program product of claim 1, wherein the network is a a storage area network.

10. The computer program product of claim 1, wherein the command is obtained from an operating system executed on the host device.

11. A computer system for facilitating processing within a computing environment and replacing manual settings of port speeds, the computer system comprising:
a device configured to perform:
obtaining a command constructed by a host device of the computing environment, the host device being coupled to the device, the command constructed based on receiving supported port speeds of a network device of a network of the computing environment and determining that a selected port speed is supported by arget port of the network device, the command transmitted to the device and including an indication of the target port of the network device and the selected port speed for the target port; and
automatically setting, by the device and based on obtaining the command constructed and transmitted to the device, a port speed of the target port to the selected port speed, the automatically setting the port speed replacing the manual setting of the port speed.

12. The computer system of claim 11, wherein the selected port speed is included in a mask of port speeds included in information transmitted with the command.

13. The computer system of claim 12, wherein the device is further configured to perform:
checking a field of the command to determine that the mask of port speeds is to be used; and
performing the automatically setting using the mask of port speeds, based on the field indicating that the mask of port speeds is to be used.

14. The computer system of claim 11, wherein the command is constructed based on a selection of the target port and the selected port speed, and based on confirming that the selected port speed is supported by the target port.

15. The computer system of claim 11, wherein the device is further configured to perform:
determining that reactivation of the target port is to be performed to change the port speed of the target port to the selected port speed;
deactivating the target port, based on determining that reactivation of the target port is to be performed; and
bringing the target port online to reactivate the target port with the selected port speed.

16. A computer-implemented method of facilitating processing within a computing environment and replacing manual settings of port speeds, the computer-implemented method comprising:
obtaining, at a device of the computing environment, a command constructed by a host device of the computing environment, the host device being coupled to the device. the command constructed based on receiving supported ort speeds of a network device of a network of the computing environment and determining that a selected ort speed is supported by a target port of the network device, the command transmitted to the device and including an indication of the target port of the network device and the selected port speed for the target port; and
automatically setting, by the device and based on obtaining the command constructed and transmitted to the device, a port speed of the target port to the selected port speed, the automatically setting the port speed replacing the manual setting of the port speed.

17. The computer-implemented method of claim 16, wherein the selected port speed is included in a mask of port speeds included in information transmitted with the command.

18. The computer-implemented method of claim 17, further comprising:
checking a field of the command to determine that the mask of port speeds is to be used; and
performing the automatically setting using the mask of port speeds, based on the field indicating that the mask of port speeds is to be used.

19. The computer-implemented method of claim 16, wherein the command is constructed based on a selection of the target port and the selected port speed, and based on confirming that the selected port speed is supported by the target port.

20. The computer-implemented method of claim 16, further comprising:
determining that reactivation of the target port is to be performed to change the port speed of the target port to the selected port speed;
deactivating the target port, based on determining that reactivation of the target port is to be performed; and
bringing the target port online to reactivate the target port with the selected port speed.

* * * * *